(12) United States Patent
Yang et al.

(10) Patent No.: US 10,243,607 B2
(45) Date of Patent: Mar. 26, 2019

(54) ELECTRONIC DEVICE

(71) Applicant: SHENZHEN ROYOLE TECHNOLOGIES CO. LTD., Shenzhen, Guangdong Province (CN)

(72) Inventors: Songling Yang, Guangdong (CN); Songya Chen, Guangdong (CN); Dan Ni, Guangdong (CN); Zihong Liu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/717,085

(22) Filed: Sep. 27, 2017

(65) Prior Publication Data
US 2018/0019777 A1    Jan. 18, 2018

Related U.S. Application Data

(63) Continuation-in-part of application No. PCT/CN2015/075382, filed on Mar. 30, 2015.

(51) Int. Cl.
*H04W 4/38*    (2018.01)
*H04B 1/3827*    (2015.01)
(Continued)

(52) U.S. Cl.
CPC .............. *H04B 1/385* (2013.01); *G06F 1/16* (2013.01); *G06F 1/163* (2013.01); *G06F 1/1615* (2013.01);
(Continued)

(58) Field of Classification Search
CPC combination set(s) only.
See application file for complete search history.

(56) References Cited

U.S. PATENT DOCUMENTS

2006/0001859 A1* 1/2006 Lohmann .............. G01S 7/4812
356/5.06
2007/0292812 A1* 12/2007 Furner .................... F21V 35/00
431/289
(Continued)

FOREIGN PATENT DOCUMENTS

| CN | 103516840 | 1/2014 |
|---|---|---|
| CN | 103827771 | 5/2014 |

(Continued)

OTHER PUBLICATIONS

International Search Report dated Sep. 22, 2015 from corresponding application No. PCT/CN2015/075382.
(Continued)

*Primary Examiner* — Cindy Trandai
(74) *Attorney, Agent, or Firm* — Hauptman Ham, LLP

(57) ABSTRACT

The present disclosure provides an electronic device. The electronic device may include a flexible support and a control unit electrically coupled to the flexible support. The control unit receives a trigger signal, and generates a corresponding control signal according to the trigger signal. The flexible support is correspondingly deformed according to the control signal. The electronic device provided in an embodiment of the present disclosure generates, according to the trigger signal, the control signal for controlling deformation of the flexible support, thereby achieving electrically controlled deformation, and improving the intellectualization of electronic equipment.

18 Claims, 8 Drawing Sheets

(51) Int. Cl.
G06F 1/16 (2006.01)
H04M 1/02 (2006.01)

(52) U.S. Cl.
CPC .......... *G06F 1/1626* (2013.01); *G06F 1/1652* (2013.01); *G06F 1/1679* (2013.01); *H04M 1/0214* (2013.01); *H04M 1/0268* (2013.01)

(56) References Cited

U.S. PATENT DOCUMENTS

| | | | |
|---|---|---|---|
| 2008/0058038 A1 | 3/2008 | Murdoch et al. | |
| 2008/0232937 A1* | 9/2008 | Abe | H01L 21/67265 414/222.02 |
| 2011/0037742 A1* | 2/2011 | Suh | G06F 3/1431 345/211 |
| 2011/0241998 A1* | 10/2011 | McKinney | G06F 1/1616 345/168 |
| 2013/0083496 A1* | 4/2013 | Franklin | G06F 1/1626 361/749 |
| 2013/0229508 A1* | 9/2013 | Li | G06F 1/3287 348/77 |
| 2014/0004906 A1 | 1/2014 | Chi et al. | |
| 2014/0104244 A1 | 4/2014 | Baldwin | |
| 2014/0189584 A1* | 7/2014 | Weng | G06F 1/163 715/808 |
| 2014/0306876 A1 | 10/2014 | Lee et al. | |
| 2014/0316305 A1* | 10/2014 | Venkatraman | A61B 5/1112 600/595 |
| 2015/0006930 A1* | 1/2015 | Antonio | G06F 1/263 713/323 |
| 2015/0135410 A1* | 5/2015 | Wu | A44C 5/18 2/338 |
| 2015/0378391 A1* | 12/2015 | Huitema | G06F 1/163 361/679.03 |
| 2016/0077548 A1* | 3/2016 | Lim | G06F 1/166 361/679.26 |
| 2016/0224305 A1* | 8/2016 | Lee | G06F 3/013 |
| 2016/0313769 A1* | 10/2016 | Yoshitani | G04G 17/045 |
| 2016/0327979 A1* | 11/2016 | Lettow | G06F 1/163 |
| 2016/0327987 A1* | 11/2016 | Huitema | G06F 1/1652 |
| 2017/0003876 A1* | 1/2017 | Marsden | H03K 17/9622 |
| 2017/0017273 A1* | 1/2017 | Weldon | G06F 1/1654 |
| 2017/0199712 A1* | 7/2017 | Lee | G01B 7/22 |
| 2017/0374751 A1* | 12/2017 | Yang | G06F 1/1652 |
| 2018/0275715 A1* | 9/2018 | Park | G06F 1/16 |
| 2018/0275763 A1* | 9/2018 | Kim | G06F 1/1652 |

FOREIGN PATENT DOCUMENTS

| | | |
|---|---|---|
| CN | 203786602 | 8/2014 |
| CN | 104317396 | 1/2015 |
| JP | 2003-524846 A | 8/2003 |
| JP | 2003-280546 A | 10/2003 |
| JP | 2004-297648 A | 10/2004 |
| KR | 10-2014-0003132 A | 1/2014 |
| WO | 2015/031426 A1 | 3/2015 |

OTHER PUBLICATIONS

Ara N Knaian et al: "The Milli-Motein: A self-folding chain of programmable matter with a one centimeter module pitch", Intelligent Robots and Systems (IROS), 2012 IEEE/RSJ International Conference on, IEEE, Oct. 7, 2012 (Oct. 7, 2012), pp. 1447-1453, XP032287750, DOI: 10.1109/IROS.2012.6385904 ISBN: 978-1-4673-1737-5; abstract; pp. 2,9.

* cited by examiner

ELECTRONIC DEVICE

CROSS REFERENCE TO RELATED APPLICATION

This application is a continuation in part of international Patent Application PCT No. PCT/CN2015/075382, tiled on Mar. 30, 2015, content of which is hereby incorporated by reference in its entirety.

TECHNICAL FIELD

The present disclosure relates to the field of electronic technology, and particularly to an electronic device.

BACKGROUND

In recent years, smart wearable devices, as a kind of electronic device, are researched and applied more and more. With the rapid development of computer software and hardware as well as interact technology, forms of the electronic devices start to be diversified, and gradually show significant application potential in fields such as industry, medical care, military, education, and daily life. Generally, a specific electronic device has a relatively fixed form. For the smart wearable devices, which are demanded to have a changeable form to be worn on a user's wrist or worn on other parts, a physical structure is used to realize such changeable form. It requires the user to perform operations on a relevant physical mechanism to change the physical structure, so that the electronic device can be worn or removed. However, it needs the user to operate the physical mechanism by himself/herself, to thereby change the physical structure to wearable state.

SUMMARY

A technical problem to be solved by embodiments of the present disclosure is to provide an electronic device which is electrically controlled to deform through a control unit.

In a first aspect, the present disclosure provides an electronic device. The electronic device may include a flexible support and a control unit electrically coupled to the flexible support. The control unit receives a trigger signal, and generates a corresponding control signal according to the trigger signal. The flexible support is correspondingly deformed according to the control signal.

The electronic device provided in the above embodiment generates, according to the trigger signal, the control signal for controlling deformation of the flexible support, thereby realizing electrically controlled deformation, and improving intellectualization of the electronic device.

BRIEF DESCRIPTION OF THE DRAWINGS

In order to illustrate the technical solutions of embodiments of the present disclosure or the related art more clearly, the accompanying drawings used in the description of the embodiments will be briefly described. Apparently, the accompanying drawings described in the following are merely for some embodiments of the present disclosure, and a person ordinarily skilled in the art still can obtain other accompanying drawings according to these accompanying drawings without any creative effort.

DETAILED DESCRIPTION

Below technical solutions of embodiments of the present disclosure will be described clearly and completely in conjunction with the accompanying drawings of the embodiments of the present disclosure. Apparently, some but not all of embodiments of the present disclosure are described. Based on the embodiments of the present disclosure, all the other embodiments obtained by a person ordinarily skilled in the art without paying creative effort fall within the protection scope of the present disclosure.

Figure 1:
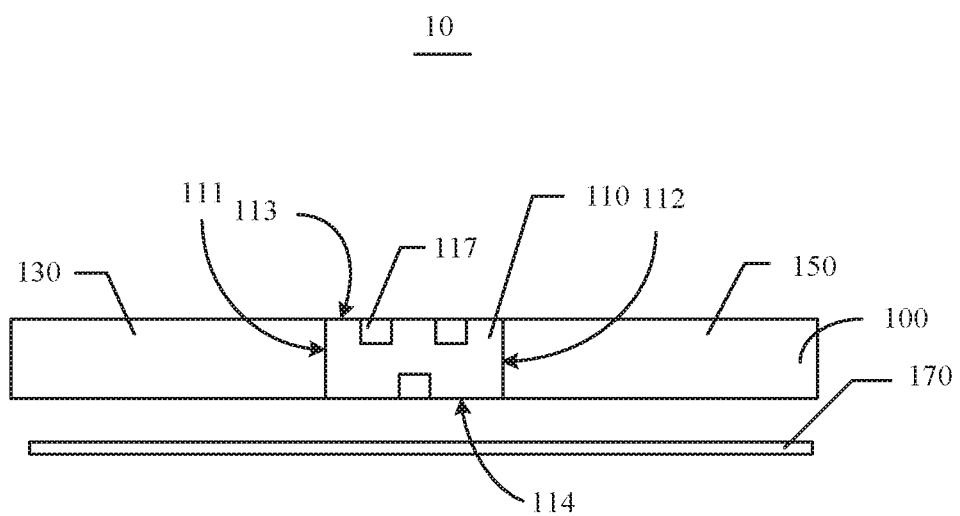
FIG. 1 is a structural schematic view of an electronic device of a preferred embodiment of the present disclosure.

Referring to FIG. 1, FIG. 1 is a structural schematic view of an electronic device of a preferred embodiment of the present disclosure. The electronic device 10 may be, but not limited to, a smart wearable device, for example, the smart wearable device is a smart wearable mobile phone. The electronic device 10 may include a flexible support 100 and a control unit 110 coupled to the flexible support 100.

In the embodiment, the control unit 110 is formed as a packaging body and is coupled to the flexible support 100. The flexible support 100 may include a first support 130 and a second support 150. The control unit 110, which is a packaging body, may include a first side surface 111 and a second side surface 112 opposite to the first side surface 111. The first support 130 is coupled to the control unit 110 through the first side surface 111, and the second support 150 is coupled to the control unit 110 through the second side surface 112. It can be understood that the coupling includes electrical coupling and mechanism coupling. The first support 130 and the second support 150 can be respectively deformed as being controlled by a control signal sent by the control unit 110. Besides, the electronic device 10 may further include a flexible display screen 170, which specifically may be a touch flexible screen, arranged on the flexible support 100 and electrically coupled to the control unit 110.

Figure 2:
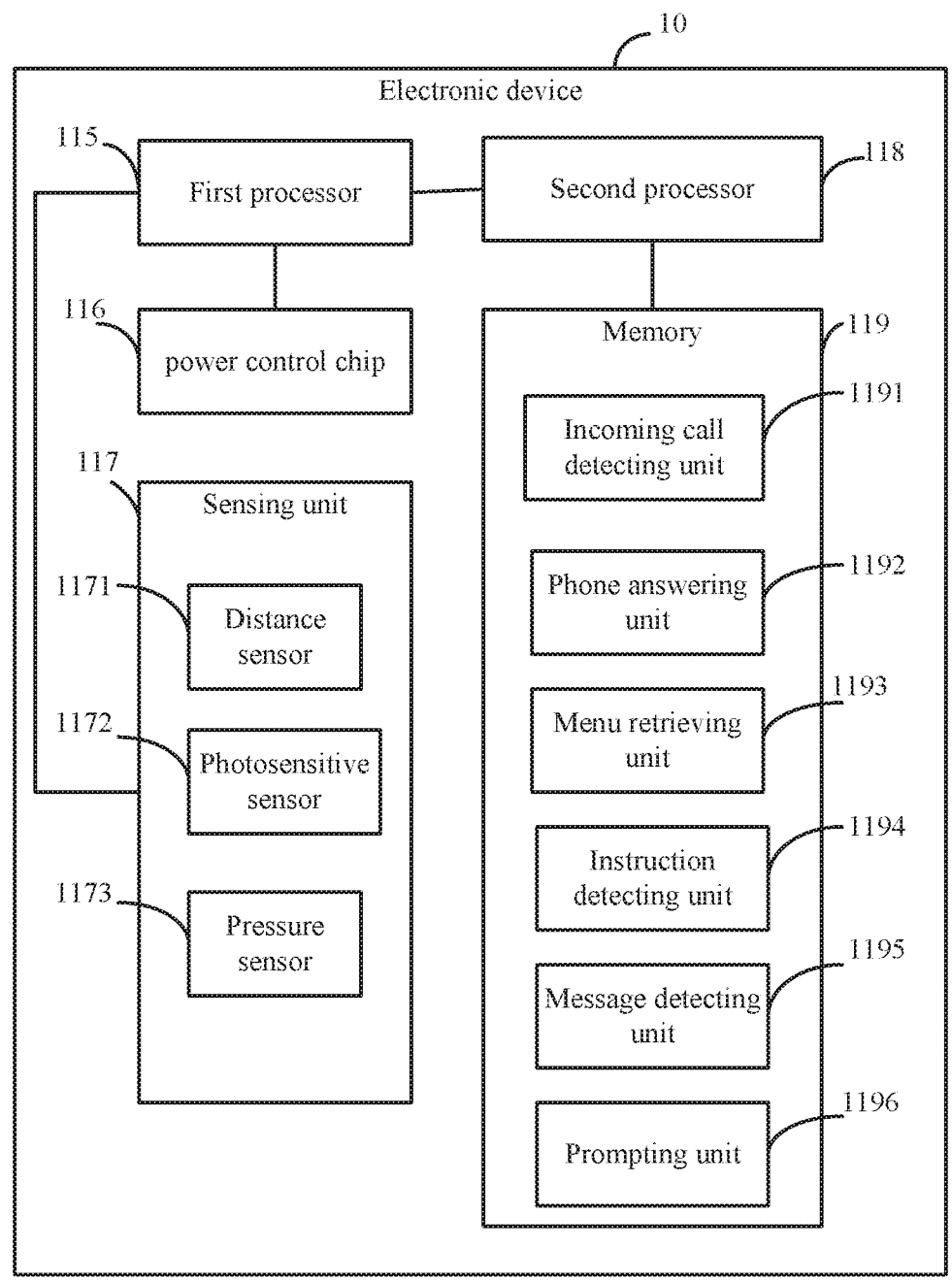
FIG. 2 is a module schematic diagram of an electronic device of a preferred embodiment of the present disclosure.
Figure 3:
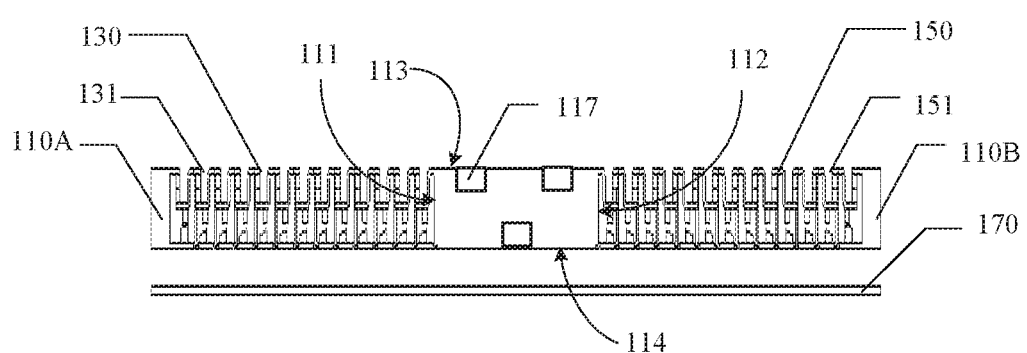
FIG. 3 is a structural schematic diagram of a first support and a second support of a preferred embodiment of the present disclosure.

Referring to both FIG. 2 and FIG. 3, FIG. 2 is a module schematic view of an electronic device of a preferred embodiment of the present disclosure, and FIG. 3 is a structural schematic view of a first support and a second support of a preferred embodiment of the present disclosure. In the embodiment, the control unit 110 may include a first processor 115 and a power control chip 116. The first support 130 includes multiple first support portions 131 hinged in sequence. The second support 150 includes multiple second support portions 151 hinged in sequence. The first processor 115 is electrically coupled to the power control chip 116. The first processor 115 is configured to receive a trigger signal, generate a corresponding control signal according to the trigger signed, and transmit the control signal to the power control chip 116. The power control chip 116 provides a corresponding electrical signal to the first support portions 131 and the second support portions 151 according to the control signal, so as to control the hinged first support portions 131 and second support portions 151 to rotate to relative positions. Specifically, different trigger signals can be corresponding to different control signals, and various control signals respectively include different electrical signal control rules corresponding to the first support portions 131 and the second support portions 151, so as to control the power control chip 116 to output a corresponding electrical signal to the first support portions 131 and the second support portions 151, so that the first support portions 131 and the second support portions 151 are set at specific relative positions, thus constructing a specific foam of the flexible support 100.

In the embodiment, the first support 130 and the second support 150 are in a belt shape. As an embodiment, the first support 130 is formed by the first support portions 131 hinged together, and the second support 150 is formed by the second support portions 151 hinged together. The first support portions 131 and the second support portions 151 are provided with electromagnetic modules. Deformation is formed through attraction generated by the electromagnetic modules of the first support portions 131 and adjacent first support portions 131, and attraction generated by electromagnetic modules of the electromagnetic modules of the second support portions 151 and adjacent second support portions 151, that is, the adjacent first support portions 131 and the adjacent second support portions 151 are brought to hingedly rotate to relative positions.

In the embodiment, the packaging body acting as the control unit 110 is taken as an example, i.e., elements and parts of the control unit 110 can be received in the packaging body to form a physical unit to be placed in the flexible support 100. The flexible support 100 is divided into two portions: the first support 130 and the second support 150. However, the present disclosure is not limited thereto. As in an embodiment of FIG. 3, the control unit 110, which is a packaging body, can be arranged at two ends of the electronic device 10, forming a packaging body 110A and a packaging body 110B, which can be respectively configured to receive the first processor 115 and the power control chip 116, i.e., the control unit 110 can be portions which are physically separated, and electrically connected for communication. Furthermore, in the embodiment where the control unit 110 is the packaging body, other elements and parts also can be received, for example, the packaging body 110A at one end further includes a receiver, and the packaging body 110E at the other end further includes other elements and parts such as a microphone. It can be understood that according to different specific product forms, it is acceptable that only one packaging body is arranged at one end, and correspondingly, only one support is needed. When the packaging bodies are at two ends, elements and parts in the packaging body 110B can be electrically coupled to the packaging body 110A through a FPC extending through the support. Certainly, multiple packaging bodies also can be used, and correspondingly, multiple supports are arranged to connect the packaging bodies. That is, the entity form of the control unit 110 can be diversified according to the specific product forms. In other embodiments, the packaging body may be not used, that is, elements and parts included in the control unit 110 can be disposed in a space constructed by the flexible support 100.

In another embodiment, the first support portions 131 and the second support portions 151 may be provided with motors, by which adjacent first support portions 131 and adjacent second support portions 151 are driven to hingedly rotate, and the overall form of the flexible support 100 is constructed by relative positions of the support portions.

Apart from the case where the flexible support 100 is formed by multiple support portions (the first support portions 131 and the second support portions 151 as described above) hinged in sequence, and the power control chip 116 outputs, according to the control signal, a corresponding electrical signal to the support portions to control the support portions to deform at relative positions, in other embodiments, the flexible support 100 also can be formed by an electrostrictive material, that is, the deformation of the material is controlled by an electrical signal.

Figure 4:
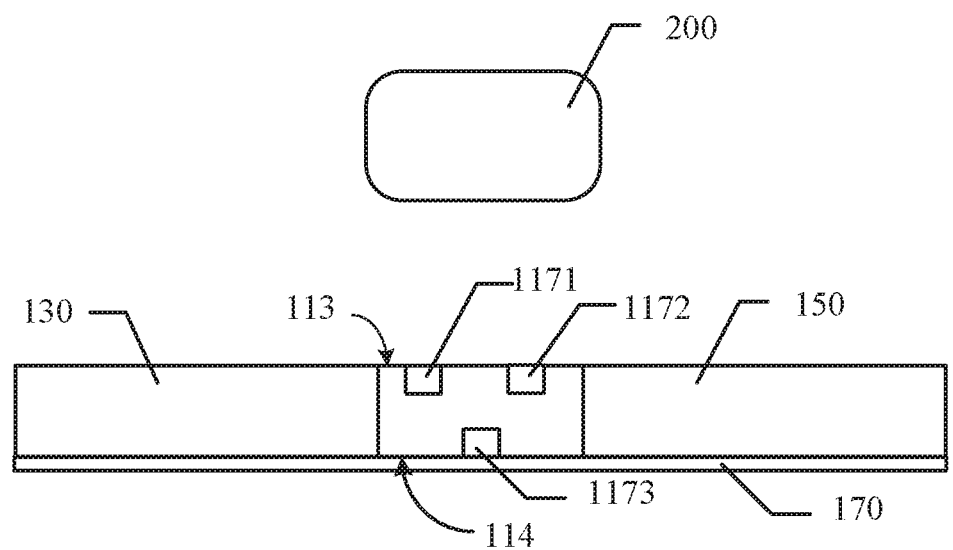
FIG. 4 to FIG. 6 are schematic views showing an electronic device of a preferred embodiment of the present disclosure changed from an unfolded state to a wearing state.
Figure 5:
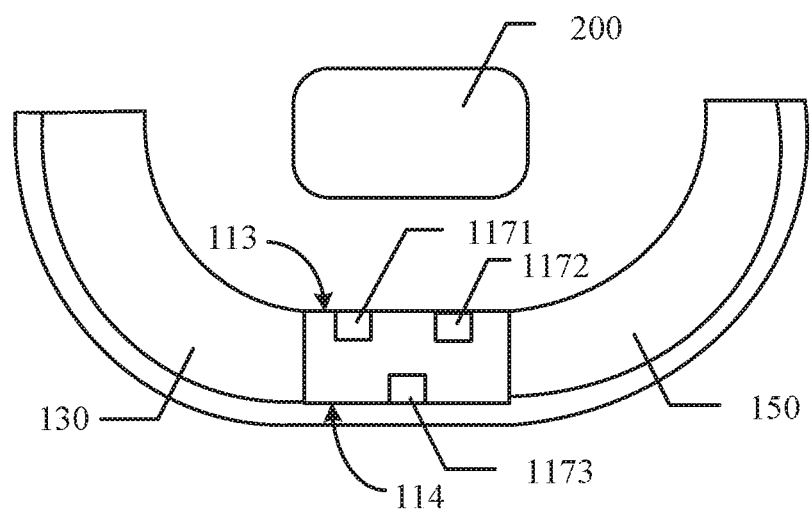
Figure 6:
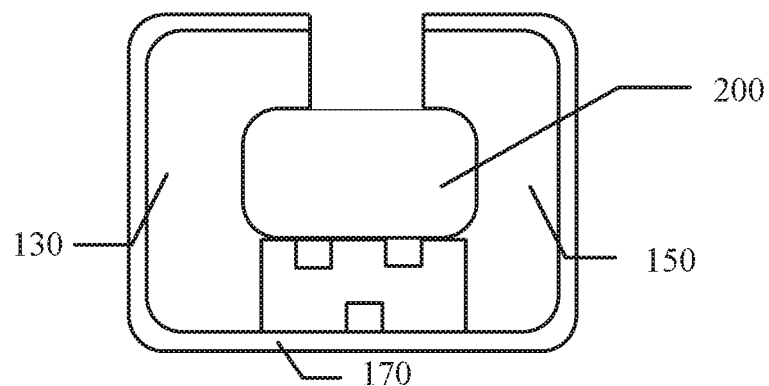

Referring to FIG. 4 to FIG. 6, FIGS. 4-6 are schematic views showing an electronic device of a preferred embodiment of the present disclosure changed from an unfolded state to a wearing state. The electronic device may further include a sensing unit 117 (see FIG. 2) configured to acquire sensing information, and generate a trigger signal when the sensing information satisfies a predetermined condition. The control unit 110 generates a control signal corresponding to the trigger signal according to the trigger signal.

The sensing unit 117 may include a distance sensor 1171, and its principle will be illustrated below in combination with the control unit 110 (which is the packaging body) described in the above embodiment. The distance sensor 1171 is arranged on a first surface 113 of the control unit 110 of the packaging body type, i.e., a surface adjacent to a wearing position. It can be understood that the position of the distance sensor 1171 can be flexibly arranged, but is not limited to the first surface 113, and the distance sensor 1171 also can be arranged in a position such as the flexible support 100 where the wearing position getting close to the electronic device can be sensed, more preferably, the distance sensor 1171 can be arranged in a position adjacent to a surface of the electronic device for wearing. The distance sensor 1171 is configured to detect a distance between a wearing position 200 (for example, a user's wrist) and the distance sensor 1171. The distance sensor 1171 generates the trigger signal when the distance between the wearing position 200 and the distance sensor 1171 is less than or equal to a predetermined distance. The first processor 115 receives the trigger signal, and generates the control signal according to the trigger signal to drive the flexible support 100 to fold. In combination with the above embodiment, the power control chip 116 outputs, according to the control signal, a corresponding electrical signal to the first support 130 and the second support 150 to control the first support 130 and the second support 150 to deform to the wearing state. Specifically, when the above hinging manner of the support portions is used, an electrical signal is output to the support portions for controlling the relative positions among the support portions to construct the overall form of the flexible support 100. In this embodiment, the wearing state includes a state that the flexible support 100 surrounds the wearing position 200.

In other embodiments, the sensing unit 117 includes a photosensitive sensor 1172 (for example, arranged on the first surface 113). A change of luminous intensity is sensed through the photosensitive sensor 1172 for controlling deformation of the flexible support 100. The change of luminous intensity includes weakening of light intensity, specifically, whether a range of the weakening of light intensity or a change of light intensity within a predetermined period achieves a threshold value can be determined. Once a predetermined condition is satisfied, the trigger signal is automatically generated, and the control unit 110 generates the control signal according to the trigger signal for controlling the flexible support 100 to deform to the wearing state.

The sensing unit 117 may further include a pressure sensor 1173. When a pressure received by the pressure sensor 1173 is larger than or equal to a predetermined pressure, the trigger signal is generated, and the control unit 110 generates the control signal according to the trigger signal to control the flexible support 100 to deform to the unfolded state. In the embodiment, in the unfolded state, an angle between adjacent first support portions 131 of the first support 130 is smaller than or equal to a first predetermined angle, an angle between the first support portion 131 of the first support 130 arranged on the first side surface 111 and the first side surface 111 is smaller than or equal to a second predetermined angle, an angle between adjacent second support portions 151 of the second support 150 is smaller than or equal to a third predetermined angle, and an angle between the second support portion 151 of the second support 150 arranged on the second side surface 112 and the second side surface 112 is smaller than or equal to a fourth predetermined angle. The first predetermined angle, the second predetermined angle, the third predetermined angle, and the fourth predetermined angle are small angles, for example, they can be, but not limited to 5 degrees. At this point, the first support 130 and the second support 150 are relatively flat. At this point, the electronic device 10 can be taken off from the wearing position. Preferably, the first predetermined angle, the second predetermined angle, the third predetermined angle, and the fourth predetermined angle are of zero degree, so that the first support 130, the second support 150, and a second surface 114 of the control unit 110 of the packaging body type opposite to a first surface 113 construct a flat support surface. When the electronic device includes the flexible display screen 170, the support surface constructed in the unfolded state can provide a support to the flexible display screen when the flexible display screen is unfolded.

Referring still to FIG. 2, the electronic device 10 may further include a second processor 118 and a memory 119. The second processor 118 and the memory 19 may be arranged in the control unit 110 of the packaging body. The memory 119 may store computer-readable program codes. In an embodiment, the computer-readable program codes may exist in the form of an incoming call detecting unit 1191 and a phone answering unit 1192. The second processor 118 may invoke the incoming call detecting unit 1191 to detect an incoming call signal, and generate the trigger signal upon detecting the incoming call signal. The first processor 115 may generate the control signal according to the trigger signal to drive the flexible support 100 to unfold. The second processor 118 may further invoke the phone answering unit 1192 to answer the phone according to the incoming call signal and/or the control signal. Specifically, the second processor 118 can invoke the phone answering unit 1192 to automatically answer the phone according to the incoming call signal. When the incoming call signal is detected, the first processor 115 also generates the control signal according to the incoming call signal to drive the flexible support 100 to unfold. The second processor 118 may further invoke the phone answering unit 1192 to automatically answer the phone according to the control signal, i.e., answering the phone and unfolding deformation are simultaneously carried out. More preferably, the second processor 118 may invoke the phone answering unit 1192 to answer the phone after receiving the control signal for a predetermined period. In the embodiment, the unfolded state may refer to a state in which the electronic device is in such a shape that it can be taken off or in such a shape which is suitable for answering the phone. In the embodiment, when the incoming call signal is detected, the control unit 110 controls the first support 130 and the second support 150 to deform to the unfolded state. The electronic device 10 can be taken off from the wearing position 200, then the second processor 118 invokes the phone answering unit 1192 to answer the phone after the first support 130 and the second support 150 are deformed to the unfolded state for a predetermined period, thus realizing automatic answering for an incoming call signal.

In another embodiment, the computer-readable program codes may exist in the form of the incoming call detecting unit 1191, a menu retrieving unit 1193, and an instruction detecting unit 1194. The second processor 118 may invoke the incoming call detecting unit 1191 to detect an incoming call signal, invoke the menu retrieving unit 1193 to retrieve a control menu when the incoming call signal is detected, and further invoke the instruction detecting unit 1194 to detect an operation on the control menu, and generate a trigger signal according to the operation. The operation includes an answering operation and/or a hang-up operation. The answering operation is used to answer the incoming call signal, and the hang-up operation is used to hang up the incoming call signal. In the embodiment, when the incoming call signal is detected, the control menu is retrieved to provide the control menu to a user. An operation of the user on the control menu is detected, and the phone is answered or hanged up according to the operation of the user. Specifically, when an operation of answering the phone is detected, the first processor 115 may generate a control signal for answering the phone according to the operation, and generate a control signal for controlling the first support 130 and the second support 150 to deform to the unfolding state. At this point, the electronic device 10 can be taken off from the wearing position to facilitate answering. When an operation of hang up is detected, only a control signal for hang up may be generated.

In at least one alternative embodiment, the computer-readable program codes may further exist in the form of a prompting unit 1196. The second processor 118 may invoke the prompting unit 1196 to generate the trigger signal upon detecting a predetermined prompting state. The first processor 115 may generate the control signal according to the trigger signal to drive the flexible support 100 to unfold, for example, drive the flexible support 100 to unfold in a continuously creeping state.

In at least one alternative embodiment, the computer-readable program codes may further exist in the form of a message detecting unit 1195. The second processor 118 may invoke the message detecting unit 1195 to detect a message signal, and generate the trigger signal upon detecting the message signal. The first processor 115 may generate the control signal according to the trigger signal to drive the flexible support to unfold in a flat state or waved state. Furthermore, the second processor 118 may further invoke the message detecting unit 1195 to detect whether the user is to make input and reply upon detecting the message signal. For example, when the user selects "reply" or a focal point falls in an input field, etc., it is determined that the user is to make input and reply, and a control signal for controlling the first support 130 and the second support 150 to deform to the unfolding state is generated. At this point, the electronic device 10 can be taken off from the wearing position to facilitate input. The message may be information sent by another electronic device to the electronic device 10, and also may be information sent by an operator to the electronic device 10. For example, when a user of another electronic device calls the electronic device 10, but the connection in the environment where the electronic device 10 is located is bad, the operator sends a message to the electronic device 10 to prompt the user of the electronic device 10. In an embodiment, when the electronic device 10 receives the message, the trigger signal also can be generated, and the control unit 110 further can generate, according to the trigger signal, the control signal to control the first support 130 and the second support 150 to deform to form a shape, which can be a wavy shape and changed continuously. At this point, when the first support 130 and the second support 150 are placed on a flat surface, the first support 130 and the second support 150 create an effect of resembling wavy creeping on the flat surface to achieve the technical effect of prompting the user. It can be understood that this manner also can be applied in incoming call reminding and other reminding in a wearing or non-wearing state. Corresponding deformation forms are generated according to the specific application types. It is understood, the first processor 115 and the second processor 118 may be the same processor which can implement the above functions as the first processor 115 and the second processor 118.

Figure 7:
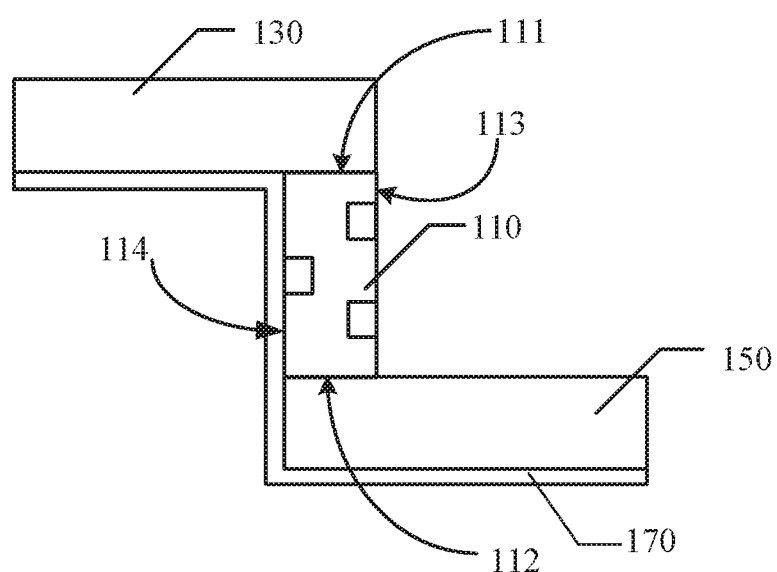
FIG. 7 is a schematic view of a shape formed by deformation of a first support and a second support of an electronic device in a first preferred embodiment of the present disclosure.
Figure 8:
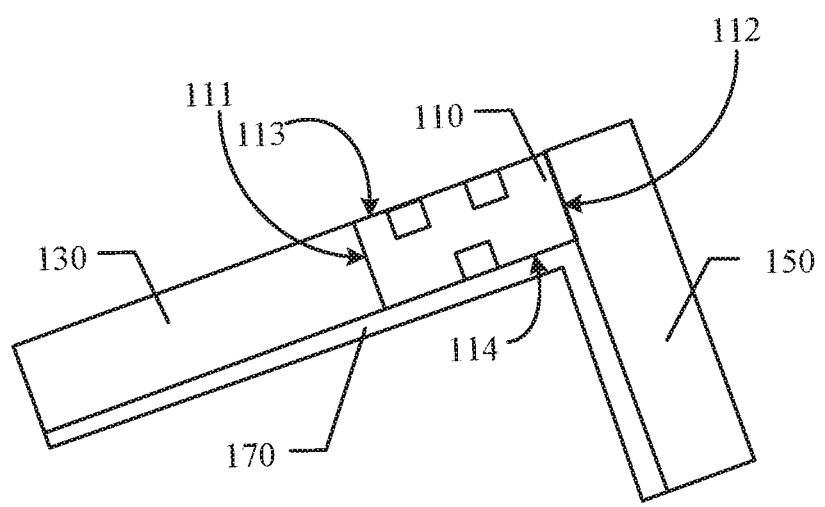
FIG. 8 is a schematic view of a shape formed by deformation of a first support and a second support of an electronic device in a second preferred embodiment of the present disclosure.

It can be understood that in other embodiments, when the electronic device 10 receives the message, the control unit 110 generates corresponding control signals according to different trigger signals to control the first support 130 and the second support 150 to deform to form shapes as shown in FIG. 7 to FIG. 10. The shape formed by the deformation of the first support 130 and the second support 150 of the electronic device 10 shown in FIG. 7 is that the first support 130 and the second support 150 are perpendicular to the control unit 110 of the packaging body respectively, and the first support 130 and the second support 150 are located at two sides of the control unit 110 of the packaging body respectively. The first support 130 and the first surface 113 define an angle of 90 degrees therebetween, and the second support 150 and the second surface 114 define an angle of 90 degrees therebetween. Alternatively, the first support 130 and the second surface 114 define an angle of 90 degrees therebetween, and the second support 150 and the first surface 113 define an angle of 90 degrees therebetween. For example, the electronic device can be automatically deformed to this shape when a message is pushed and the electronic device is not worn. The shape formed by the deformation of the first support 130 and the second support 150 of the electronic device 10 shown in FIG. 8 is that the first support 130 of the electronic device 10 is parallel to the control unit 110 of the packaging body, and the second support 150 and the control unit 110 of the packaging body define an angle therebetween. Thereinto, the angle defined by the second support 150 and the control unit 110 of the packaging body may be the angle defined by the second support 150 and the first surface 113 of the control unit 110 of the packaging body, and also may be the angle defined by the second support 150 and the second surface 114 of the control unit 110 of the packaging body. It can be understood that in other embodiments, the shape formed by the deformation of the first support 130 and the second support 150 of the electronic device 10 is that the first support 130 of the electronic device 10 and the control unit 110 of the packaging body define an angle therebetween, and the second support 150 is parallel to the control unit 110 of the packaging body. Thereinto, the angle defined by the first support 130 and the control unit 110 of the packaging body may be the angle defined by the first support 130 and the first surface 113 of the control unit 110 of the packaging body, and also may be the angle defined by the first support 130 and the second surface 114 of the control unit 110 of the packaging body. The form can be applied for facilitating reading and viewing.

Figure 9:
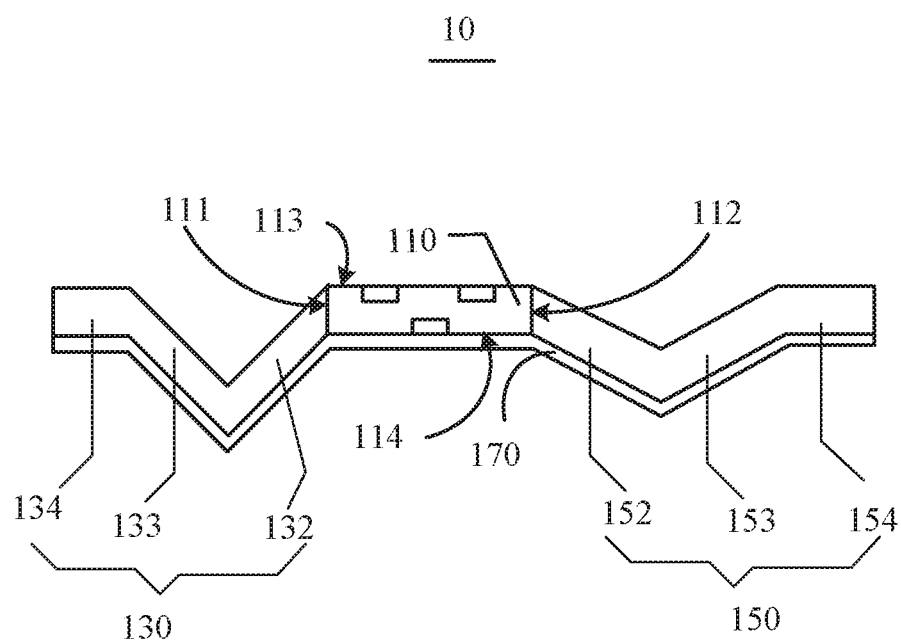
FIG. 9 is a schematic view of a shape formed by deformation of a first support and a second support of an electronic device in a third preferred embodiment of the present disclosure.

A shape formed by the deformation of the first support 130 and the second support 150 of the electronic device 10 shown in FIG. 9 is described as follows. The first support 130 includes a first portion 132, a second portion 133, and a third portion 134. One end of the first portion 132 is connected to the first side surface 111 of the control unit 110 of the packaging body, the other end of the first portion 132 is connected to one end of the second portion 133, the first portion 132 and the second portion 133 form a "V" shape, the other end of the second portion 133 is connected to the third portion 134, and the third portion 134 is parallel to the control unit 110 of the packaging body. The second support 150 includes a fourth portion 152, a fifth portion 153, and a sixth portion 154. One end of the fourth portion 152 is connected to the second side surface 112 of the control unit 110 of the packaging body, the other end of the fourth portion 152 is connected to one end of the fifth portion 153, the fourth portion 152 and the fifth portion 153 form a "V" shape, the other end of the fifth portion 153 is connected to the sixth portion 154, and the sixth portion 154 is parallel to the control unit 110 of the packaging body. In the embodiment, the "V" shape formed by the fourth portion 152 and the fifth portion 153 and the "V" shape formed by the first portion 132 and the second portion 133 have openings of the same direction. It can be understood that in other embodiments, the "V" shape formed by the fourth portion 152 and the fifth portion 153 and the "V" shape formed by the first portion 132 and the second portion 133 have openings of different directions. The shape also can be applied to prompting deformation in the wearing state.

Figure 10:
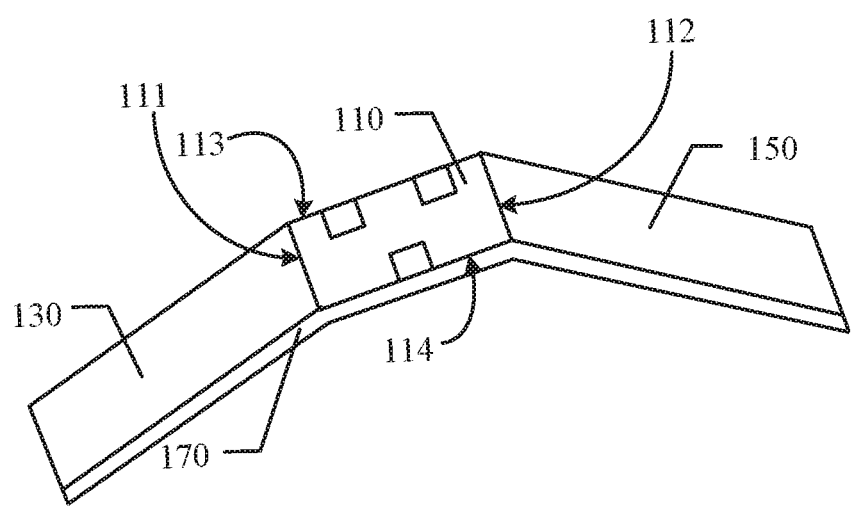
FIG. 10 is a schematic view of a shape formed by deformation of a first support and a second support of an electronic device in a fourth preferred embodiment of the present disclosure.

A shape formed by the deformation of the first support 130 and the second support 150 of the electronic device 10 shown in FIG. 10 is described as follows. The first support 130 and the first surface 113 of the control unit 110 of the packaging body define an angle therebetween, and the second support 150 and the first surface 113 of the control unit 110 of the packaging body define an angle therebetween. In other embodiments, the first support 130 and the second surface 114 of the control unit 110 of the packaging body can define an angle therebetween, and the second support 150 and the second surface 114 of the control unit 110 of the control unit 110 of the packaging body define an angle therebetween. It can be understood that the shapes formed by the deformation of the first support 130 and the second support 150 of the electronic device 10 are not limited to the shapes shown in FIG. 7 to FIG. 10.

The forms of the unfolding state and the control manners of the specific application scenarios in the above embodiments are used to illustrate the principle of the present disclosure. The range of the unfolding state of the present disclosure includes any deformation forms in which the electronic device can be taken off. It can be understood that the electronic device can be provided with multiple deformation forms on the basis of its deformation structure and electrically controlled property, and can be associated with and defined in specific application scenarios according to usage habit and requirements based on the principle of the present disclosure.

The deformation application of the electronic device of the present disclosure is not limited to reception of messages and incoming calls, but also can include relevant reminders, notifications, and so on of other applications of the electronic device, also can include interaction with resources of other devices in communication connection with the electronic device. The communication connection includes communication connection in wired and wireless manners. The manner of acquiring the resources can be initiative acquiring of the electronic device and also can be pushing from other devices. The resources can include messages and incoming calls from other devices or reminders, notifications, and so on of other applications, and also can be multimedia resource pushing, miracast, and so on from other devices.

In at least one alternative embodiment, each unit may be realized by hardware, for example, an application specific integrated circuit (ASIC), a single circuit, a processor (shared, specific, or chipset), a combined logic circuit, and/or other appropriate assembly.

The electronic device provided in the above embodiments of the present disclosure, on one hand, can generate different deformations according to different trigger signals, including that the electronic device can realize automatic wearing and take-off, thereby improving user experience. The electronic device also can be correspondingly deformed according to the specific application scenarios, thereby improving the intellectualization of the electronic device, and facilitating user's use.

Through the description of the above embodiments, a person skilled in the art can clearly know that the present disclosure can be realized by software plus necessary hardware platform, and also can be completely implemented by hardware. Based on such understanding, all or part of the technical solutions of the present disclosure contributing to the background art can be embodied in a form of software product. The computer software product can be stored in a storage medium, including several instructions for the electronic device (including PAD, mobile phone, earphone, wearable device, etc.) to implement the method described in some portions of the embodiments or embodiment of the present disclosure.

Finally, it shall be indicated that the above-mentioned embodiments are merely for illustrating the technical solutions of the present disclosure, rather than limiting the present disclosure. Although the present disclosure is described in detail with reference to the above-mentioned embodiments, a person ordinarily skilled in the art shall know that the protection scope of the present disclosure is not limited thereto, while modifications or replacements easily envisaged by any one skilled in the art, within the technical scope of the present disclosure, shall fall within the protection scope of the present disclosure. Therefore, the protection scope of the present disclosure shall be based on the protection scope of the claims.

What is claimed is:

1. An electronic device, comprising:
a flexible support;
a sensing unit; and
a control unit electrically coupled to the flexible support;
wherein, the control unit receives a trigger signal, and generates a corresponding control signal according to the trigger signal; the flexible support is correspondingly deformed according to the control signal; the flexible support generates deformations to be automatically worn on or taken off from a user according to sensing information generated by the sensing unit, and the flexible support generates deformations corresponding to a specification application scenario when the specification application scenario is detected by the control unit.

2. The electronic device of claim 1, wherein the control unit comprises a processor and a power control chip; the processor is operable to receive the trigger signal, generate the control signal according to the trigger signal, and transmit the control signal to the power control chip; the power control chip is operable to output, according to the control signal, a corresponding electrical signal to control deformation of the flexible support.

3. The electronic device of claim 2, wherein the flexible support comprises a plurality of support portions hinged in sequence, the power control chip is operable to output, according to the control signal, a corresponding electrical signal to the support portions for controlling relative positions of the support portions.

4. The electronic device of claim 3, wherein the flexible support is provided with electromagnetic modules, the adjacent support portions of the flexible support are brought to hingedly rotate relative positions by attraction generated by the electromagnetic modules, to construct the form of the flexible support.

5. The electronic device of claim 3, wherein the flexible support is provided with motors, the adjacent support portions of the flexible support are brought to hingedly rotate relative positions by the motors, to construct the form of the flexible support.

6. The electronic device of claim 1, wherein when the sensing information satisfies a predetermined condition, the control unit generates the control signal corresponding to the trigger signal.

7. The electronic device of claim 6, wherein the sensing unit comprises a distance sensor to sense a distance between a wearing position and the distance sensor, and generate the trigger signal when the distance between the wearing position and the distance sensor is less than or equal to a predetermined distance; and the control unit generates the control signal according to the trigger signal to drive the flexible support to fold.

8. The electronic device of claim 6, wherein the sensing unit comprises a photosensitive sensor to sense a change of luminous intensity, and generate the trigger signal when the change of luminous intensity satisfies a predetermined condition; and the control unit generates the control signal according to the trigger signal to drive the flexible support to fold.

9. The electronic device of claim 6, wherein the sensing unit comprises a pressure sensor, the pressure sensor generates the trigger signal when a pressure received by the pressure sensor is larger than or equal to a predetermined pressure; the control unit generates the control signal according to the trigger signal to drive the flexible support to unfold.

10. The electronic device of claim 1, wherein the control unit is operable to detect an incoming call signal, generate the control signal to drive the flexible support to unfold when the incoming call signal is detected, and answer a phone according to at least one of the incoming call signal and the control signal.

11. The electronic device of claim 1, wherein the control unit is operable to detect an incoming call signal, retrieve a control menu when the incoming call signal is detected, and detect an operation on the control menu, the operation comprising an answering operation or a hang-up operation;

the control unit is further operable to generate the control signal to drive the flexible support to unfold when the answering operation is detected, and answer a phone according to the control signal.

12. The electronic device of claim 1, wherein the control unit is operable to generate the control signal to drive the flexible support to unfold in a flat state or waved state when a message signal is detected.

13. The electronic device of claim 1, wherein the control unit is operable to generate the control signal to drive the flexible support to unfold in a continuously crawling state when a predetermined prompting state is detected.

14. The electronic device of claim 1, further comprising a flexible display screen which is arranged on the flexible support and electrically coupled to the control unit.

15. The electronic device of claim 1, wherein the flexible support comprises a first support and a second support located at two opposite sides of the control unit, and the first support and the second support are physically and electrically connected to the control unit.

16. The electronic device of claim 1 further comprising a pressure sensor and a distance sensor located at two opposite faces of the control unit, wherein the distance sensor faces a wearing wrist of the user.

17. The electronic device of claim 1, wherein the control unit comprises two packaging bodies respectively connected to opposite ends of the flexible support, one packaging body receives a receiver, and the other packaging body receives a microphone.

18. The electronic device of claim 1, wherein the flexible support is formed by an electrostrictive material and deformation of the electrostrictive material is controlled by the electrical signal.

* * * * *